UNITED STATES PATENT OFFICE.

LEWIS H. SPEAR, OF BRAINTREE, VERMONT.

IMPROVEMENT IN PRESERVING ANIMAL AND VEGETABLE SUBSTANCES.

Specification forming part of Letters Patent No. 67,991, dated August 20, 1867; antedated August 15, 1867.

*To all whom it may concern:*

Be it known that I, LEWIS HOBART SPEAR, of Braintree, in the county of Orange and State of Vermont, United States of America, have invented or discovered a new and Improved Mode of Preserving Animal or Vegetable Matter, whether fluid or solid, in a wholesome and edible condition for food or for beverage without material loss or change of its natural flavor; and I do hereby declare that the following is a full, clear, and exact description of my said invention or discovery.

After many years of careful and laborious experiments with various antiseptic materials known to be friendly to man when taken into his stomach with food, I have discovered that animal or vegetable matter, either solid or fluid, when subjected to the action of either of the herein-named solutions, can be preserved in a wholesome and edible condition for food or for beverage without material loss or change of its natural flavor.

The nature of my invention or discovery consists, first, in subjecting animal or vegetable matter to the action of a solution of a mixture of boracic acid and sulphurous acid, in connection with an alkali and water, for the purpose of preserving the said animal or vegetable matter in a pure and wholesome condition for food; second, in subjecting animal or vegetable matter to the action of a solution of sulphurous acid, in combination with an alkali and water, for the purpose of preserving the said animal or vegetable matter in a pure and wholesome condition for food; third, in subjecting animal or vegetable matter to the action of a solution of boracic acid, in combination with an alkali and water, for the purpose of preserving the said animal or vegetable matter in a pure and wholesome condition for food; fourth, in subjecting or animal or vegetable matter to the action of a solution of boracic acid in water, for the purpose of preserving the said animal or vegetable matter in a pure and wholesome condition for food.

The object of my invention or discovery is to supply, at comparatively small cost, a wholesome and agreeable food to persons living in densely-populated countries or cities, from other and remote localities, where the population is sparse, and where flesh, fish, fowl, fruit, and vegetables are abundant and cheap; and also to preserve matter of domestic production or use in a sweet and wholesome condition through such seasons of the year, and through such periods of time, as would under ordinary circumstances, produce fermentation and putrefaction.

Having stated the nature of my invention or discovery, and its chief objects, I will proceed to describe the manner in which I have carried it out; and, for the convenience of reference, I will designate by number the different preserving solutions which I make and use.

*Solution No. 1.*—The solution of a mixture of boracic acid and sulphurous acid, in connection with an alkali and water, I make in the following manner: I first make a saturated solution of good commercial borax in water, and then force into the said saturated solution a stream of sulphurous-acid gas by means of a pump and pipe connected with the dome of a furnace where I burn the sulphur to generate the said gas, and I continue to force said gas into the said solution until it is rendered neutral, which I determine by testing with litmus paper in the usual way.

*Solution No. 2.*—The solution of sulphurous acid, in combination with an alkali and water, I make by dissolving fine crystals of sulphite of soda in water until the specific gravity of said solution will mark from five to thirty-five degrees by Baumé, according to the strength or specific gravity desired, and I neutralize said solution with sulphurous acid.

*Solution No. 3.*—The solution of boracic acid, in combination with an alkali and water, I make by dissolving good commercial borax in water until the said solution is saturated, and I neutralize said solution with boracic acid.

*Solution No. 4.*—The solution of boracic acid and water I make by dissolving the pure crystals of boracic acid in water to saturation.

The antiseptic power of each of the above-named solutions may be diminished or increased by diminishing or increasing its specific gravity.

The before-named solution No. 1 may be made by dissolving the crystals of borax and the crystals of sulphite of soda in water, and then neutralizing said solution with sulphurous acid; but I prefer making said solution in the manner hereinbefore stated.

For preserving animal matter I prefer to use solution No. 1, and for preserving vegetable matter I prefer to use solution No. 2; but I have had good results from the use of the other solutions.

Any animal whose meat I wish to preserve may be killed and dressed in the usual way, and cut into pieces of the same dimensions as those usually cut for making salt beef. The said pieces I immerse for twenty-four hours or more in a bath made of solution No. 1, diluted with water, till its specific gravity marks 5° by Baumé, contained in a wooden cistern, or other suitable vessel, of capacity sufficient to allow the said pieces to be completely covered by the said solution. After being immersed twenty-four hours or more, I take said pieces out of said solution and put them into ordinary beef-barrels, or other suitable vessels, taking care to leave sufficient room in said barrels to allow said pieces placed therein to be completely covered by a fresh quantity of solution No. 1 of 5° by Baumé, which I pour into said barrels and over said pieces. Said barrels are now headed up in the usual manner, and so kept till the said pieces are wanted for the table for food, when they may be taken out, rinsed in fresh water for a minute or two, and cooked in any manner desired.

Fish, fowl, birds, and all similar animals, may be preserved in the manner above stated for preserving meat.

When I desire to preserve animals entire to be used as food I proceed as follows: The animal is bled by severing one of the carotid arteries, and its body suspended in a vertical position by the hind legs, that the discharge of blood may be rapid and complete. Immediately after the blood has been discharged I lower the body of the animal to a horizontal position, and elevate the head and especially the nose, so that said head shall be higher than the body. I do this for the purpose of preventing the escape and waste of the preserving solution through the lungs and windpipe at the nostrils. Into that part of the severed artery leading in the direction of the heart I insert a tube or pipe, and firmly secure it there by a suitable ligature, for the purpose of preventing any escape of the solution at the joining of said artery and tube. The other part of said severed artery leading in the direction of the head I firmly close by a suitable ligature, to prevent any flow and waste of the solution from that direction. Then, with a suitable pump or equivalent means, either of the above-named solutions, but, by preference, solution No. 1 of specific gravity 5° by Baumé, is injected until the arteries and veins are completely filled, the solution being kept all the time during the operation of injecting at a temperature of 100° by Fahrenheit, by means of a coil of pipe heated by steam or other suitable means. For every pound of the "live weight" of the animal I inject two ounces of the said solution. The skin or hide of the animal should not be removed until the flesh has absorbed the solution, which will require from thirty minutes to three hours, according to the weight and bulk of the animal. After a sufficient time has elapsed for the absorption of the solution I again suspend the animal and remove the hide and entrails in the ordinary way.

Meat thus prepared will keep sweet for a long time even in hot climates; but when I wish to keep it for years I cut it in pieces and pack in barrels, and cover it with a solution of the same kind and of the same specific gravity as that which was injected into it.

Birds or fowl whose live weight is more than one pound, or whose arteries are large enough to permit of their being injected, may be preserved entire by injecting into their arteries and veins the same kind of solution, and the same quantity for every pound of the live weight of said birds or fowl, that I use for preserving meat, as hereinabove stated.

Birds or fowl whose live weight is less than one pound, or whose arteries are too small to permit of their being injected, may be preserved entire by injecting said solution into their crops and intestines, using the same kind of solution, and the proportionate quantity, as above stated, for meat.

To preserve oysters I thoroughly mix with them three ounces of solution No. 1, of specific gravity 5° Baumé, for every pound of said oysters.

To preserve lobsters I boil them from thirty to forty minutes in solution No. 1, of specific gravity 5° Baumé, and then pack in suitable vessels and cover them with said solution, same as cut meats.

Animal substance treated as above directed remains sweet for a long time after it is cooked. When it is designed to supply people on a journey, or an army on the march, it can be cooked and put in suitable vessels and covered with the soup, as fruit is with sirup.

To preserve milk, say for six days, I mix with it twenty-five ounces of solution No. 1, specific gravity 5° Baumé for every one hundred pounds of milk, and to preserve one hundred pounds one month I mix with it fifty ounces of said solution, and the same proportion for a longer time.

If the above solution is made to mark 18° by Baumé instead of 5°, a much less quantity of said solution may be used, six and one-fourth ounces of 18° Baumé being equal to twenty-five ounces of 5° Baumé.

In preserving fruits and vegetables it is best to prepare them in the manner heretofore practiced for preserving them in hermetically-sealed vessels, by cooking them a little less than if to be immediately used on the table, or until they are completely scalded through. Then take the partially-cooked vegetable or fruit out of the kettle in which they have been scalded and place them in the vessels in which they are to be kept, leaving the juice or sirup in which they were scalded in said kettle. Now, add to said juice or sirup one ounce of solution No. 2, specific gravity 18° Baumé, for every eight pounds of said vegetable or fruit, with the juice, weighed before scalding, and thoroughly mix said solution with said sirup or juice; then pour said juice or sirup upon the said scalded vegetable matter or fruit until it is completely covered; then cork the vessels containing said vegetable matter, or cover said vessels with cloth or paper, to keep out dust and insects. If there is not sufficient juice or water left in said kettle after removing said vegetable matter to cover the said fruit or vegetables, water must be added, when the said solution is introduced and well mixed with said solution.

In making sauce of small fruits the said solution No. 2, specific gravity 18° Baumé, may be added to the said fruit while in the kettle, and well mixed.

Tomatoes, to be preserved, should be first scalded and peeled, and then put into the kettle and kept boiling until well cooked, and care should be taken to stir them well after the solution is added, that said solution may completely permeate them.

Cider or wine, after attaining the flavor desired, may be preserved by adding the above solution No. 2, specific gravity 18° Baumé, at the rate of one ounce of said solution to three gallons of said cider or wine. Cork tight, and set away in cool place.

When it is desired to preserve animals entire, and not to be used for food, but for specimens or for dissection, and where the flavor is not important, I proceed as follows: I take any desired quantity of solution No. 2, and, putting it into any suitable vessel, I then force into the said solution a stream of sulphurous-acid gas, by the same means hereinbefore stated for making said solution, until the said solution is completely saturated with the said sulphurous-acid gas, making what I call my concentrated preserving-solution.

Animals entire may be preserved by injecting said concentrated solution into their arteries and veins in the manner hereinbefore described; and human bodies may be embalmed by injecting the said concentrated preserving solution into their arteries and veins; but when I wish to preserve a human body for a great length of time, or for years, about three days after the said concentrated solution has been injected I inject a fresh supply of the said solution, equal in quantity to the first, or about ten per cent., by weight, of the said solution to the weight of said human body.

Animal or vegetable substances, when treated in the manner as herein described, may be preserved in vessels that are not hermetically sealed, but completely sealing said vessels is not objectionable.

The water used in making the above-named solutions should be pure.

If desired, the above-named solutions may be sweetened with sugar or honey, and flavored with spices to taste, without detriment to their antiseptic powers.

When fruits are required to be preserved in sirup, one dram of solution No. 2, specific gravity 18 Baumé, should be added and mixed with each pound of sirup.

I neutralize my preserving-solutions, except the boracic acid and solution No. 4, for the purpose of preserving the natural flavor of the matter subjected to their action.

The specific gravities herein named, and the degrees of temperature herein stated, and the proportions of preserving-solution herein directed to be used to the pound or any other named quantity of matter to be treated, are not rigid, and each or all of them may be varied considerably without seriously affecting the results.

Porcelain-lined vessels are preferred for mixing the said preserving-solution with vegetable matter while hot, and glass or stoneware vessels should be used, though wooden vessels will answer for keeping said vegetable matter in after having been mixed with said solution.

I have used my said preserving-solutions at various degrees of heat, from 60° Fahrenheit to the boiling-point of said solutions, but, with my present experience, I prefer to use said solutions, when treating animal matter with them, at a temperature of 100° or 110° Fahrenheit; but in treating fruit and vegetables I use them at a temperature of 212° Fahrenheit.

I do not intend to confine myself to the use of soda in connection or in combination with sulphurous acid, nor to soda in combination or connection with boracic acid, because many other compounds of sulphurous acid and many other compounds of boracic acid will answer the same purpose very well; but at present I prefer to use sulphite of soda and biborate of soda, (borax,) as hereinbefore stated. Neither do I mean to confine myself to the use of sulphurous acid or boracic acid to neutralize the before-named solutions, as other acids will answer; but at present I prefer to use the acids above-named for that purpose.

What I claim as my invention or discovery, and desire to secure by Letters Patent, is—

1. Subjecting animal or vegetable matter to the action of a solution of a mixture of borax (biborate of soda) or any other compound of boracic acid in connection with sulphite of soda or any other compound of sulphurous acid, in the manner substantially as herein described, for the purpose herein specified.

2. Subjecting animal or vegetable matter to the action of a solution of sulphite of soda or any other compound of sulphurous acid, in the manner substantially as herein described, for the purpose herein specified.

3. Subjecting animal or vegetable matter to the action of a solution of borax (biborate of soda) or any other compound of boracic acid, in the manner substantially as herein described, for the purpose herein specified.

4. Subjecting animal or vegetable matter to the action of a solution of boracic acid, in the manner substantially as herein described, for the purpose herein specified.

L. H. SPEAR.

Witnesses:
 WM. DEAN OVEREL,
 A. V. BRIESEN.